US009156491B2

(12) United States Patent
Okano et al.

(10) Patent No.: US 9,156,491 B2
(45) Date of Patent: Oct. 13, 2015

(54) STEERING SYSTEM

(71) Applicant: JTEKT CORPORATION, Osaka-shi, Osaka (JP)

(72) Inventors: Ryota Okano, Hamamatsu (JP); Tomonori Sugiura, Yamatokoriyama (JP)

(73) Assignee: JTEKT CORPORATION, Osaka (JP)

(*) Notice: Subject to any disclaimer, the term of this patent is extended or adjusted under 35 U.S.C. 154(b) by 1 day.

(21) Appl. No.: 14/259,718

(22) Filed: Apr. 23, 2014

(65) Prior Publication Data

US 2014/0331810 A1 Nov. 13, 2014

(30) Foreign Application Priority Data

May 10, 2013 (JP) ................................ 2013-100589

(51) Int. Cl.

| | |
|---|---|
| ***B62D 1/184*** | (2006.01) |
| ***B62D 1/187*** | (2006.01) |
| *F16B 1/00* | (2006.01) |

(52) U.S. Cl.

CPC ................ *B62D 1/187* (2013.01); *B62D 1/184* (2013.01); *F16B 2001/0092* (2013.01)

(58) Field of Classification Search

CPC .. B62D 1/184; B62D 1/187; F16B 2001/0092
USPC .................................... 74/493, 495; 280/775
See application file for complete search history.

(56) References Cited

U.S. PATENT DOCUMENTS

| | | | | |
|---|---|---|---|---|
| 5,893,676 | A * | 4/1999 | Yamamoto et al. | 403/325 |
| 6,092,955 | A * | 7/2000 | Chartrain et al. | 403/283 |
| 7,083,197 | B2 * | 8/2006 | Lutz | 280/775 |
| 2004/0057786 | A1 | 3/2004 | Heiml | |
| 2014/0076092 | A1 * | 3/2014 | Kwon et al. | 74/493 |
| 2014/0318303 | A1 * | 10/2014 | Sugiura | 74/493 |

FOREIGN PATENT DOCUMENTS

| | | |
|---|---|---|
| JP | A-2008-081026 | 4/2008 |
| JP | A-2010-264870 | 11/2010 |

OTHER PUBLICATIONS

Extended European Search Report issued in International Application No. 14166406.0 dated Sep. 29, 2014.

* cited by examiner

*Primary Examiner* — Laura Freedman
(74) *Attorney, Agent, or Firm* — Oliff PLC

(57) ABSTRACT

A stationary tooth row is provided in a restricted member that is not displaced together with a steering wheel during tilt adjustment of a steering system. A movable tooth row is provided in a movable member that is displaced in a tilt direction) together with the steering wheel during tilt adjustment. The movable tooth row includes a first movable tooth and second movable teeth. A first curvature radius of a tooth tip of the first movable tooth is made smaller than a second curvature radius of a tooth tip of each of the second movable teeth to make a tooth depth of the first movable tooth greater than a tooth depth of each of the second movable teeth.

14 Claims, 8 Drawing Sheets

STEERING SYSTEM

INCORPORATION BY REFERENCE

The disclosure of Japanese Patent Application No. 2013-100589 filed on May 10, 2013 including the specification, drawings and abstract, is incorporated herein by reference in its entirety.

BACKGROUND OF THE INVENTION

1. Field of the Invention

The invention relates to a steering system.

2. Description of the Related Art

A structure for preventing half-lock, for example, in a steering system in which tilt adjustment can be made has been proposed. With this structure, in the course of engaging first lock teeth with second lock teeth, a guide projection that projects from a tooth tip of at least one of the first lock teeth is engaged with the corresponding second lock teeth before the remaining first lock teeth are engaged with the corresponding second lock teeth, so that the first lock teeth and the second lock teeth are aligned with each other as a whole. In this way, occurrence of half-lock is restricted. See Japanese Patent Application Publication No. 2010-264870 (JP 2010-264870 A), for example.

Japanese Patent Application Publication No. 2008-81026 (JP 2008-81026 A) describes a lock structure using engagement of teeth, in which the height of a specific tooth out of the teeth is made higher than that of the remaining teeth and the pressure angle of the specific tooth is made smaller than that of the remaining teeth.

In the structure described in JP 2010-264870 A, the guide projection that projects from the tooth tip has an insufficient strength and is not formed with ease. This exerts disadvantageous effect on the manufacturing. In the structure described in JP 2008-81026 A, the pressure angle of at least one of the teeth is made different from that of the remaining teeth. This makes the manufacturing difficult.

SUMMARY OF THE INVENTION

One object of the invention is to provide a steering system that is configured so that the possibility of occurrence of half-lock is reduced, and that is easy to manufacture.

A steering system according to an aspect of the invention includes: a restricted member that is restrained from being displaced together with a steering wheel during tilt adjustment or telescopic adjustment; a movable member that is displaced together with the steering wheel during tilt adjustment or telescopic adjustment; a fastening mechanism that fastens the movable member and the restricted member together along a fastening direction in response to a rotational operation of an operating lever; a stationary tooth row provided in the restricted member; and a movable tooth row provided in the movable member, and engageable with the stationary tooth row. One of the stationary tooth row and the movable tooth row includes a first tooth and a second tooth. A pressure angle of the first tooth and a pressure angle of the second tooth are equal to each other. A tooth depth of the first tooth is made greater than a tooth depth of the second tooth by setting a first curvature radius of a rounded portion of the first tooth, the rounded portion being a tooth tip of the first tooth, smaller than a second curvature radius of a rounded portion of the second tooth, the rounded portion being a tooth tip of the second tooth.

In the steering system according to the above aspect, in the course of fastening the movable member to the restricted member along the fastening direction, the first movable tooth having the tooth depth that is greater than the tooth depth of each of the remaining movable teeth (the second movable teeth) engages with the corresponding stationary teeth of the stationary tooth row before the remaining movable teeth (the second movable teeth) engage with the corresponding stationary teeth. Thus, it is possible to guide engagement of the remaining movable teeth (the second movable teeth) with the corresponding stationary teeth of the stationary tooth row. Thus, the possibility of occurrence of half-lock is reduced. The first curvature radius of the tooth tip (the rounded portion) of the first movable tooth is set smaller than the second curvature radius of the tooth tip (the rounded portion) of each of the second movable teeth to make the tooth depth of the first movable tooth greater than the tooth depth of each of the second movable teeth. In addition, the pressure angle of the first movable tooth and the pressure angle of the second movable teeth are set equal to each other. This allows easy manufacturing.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
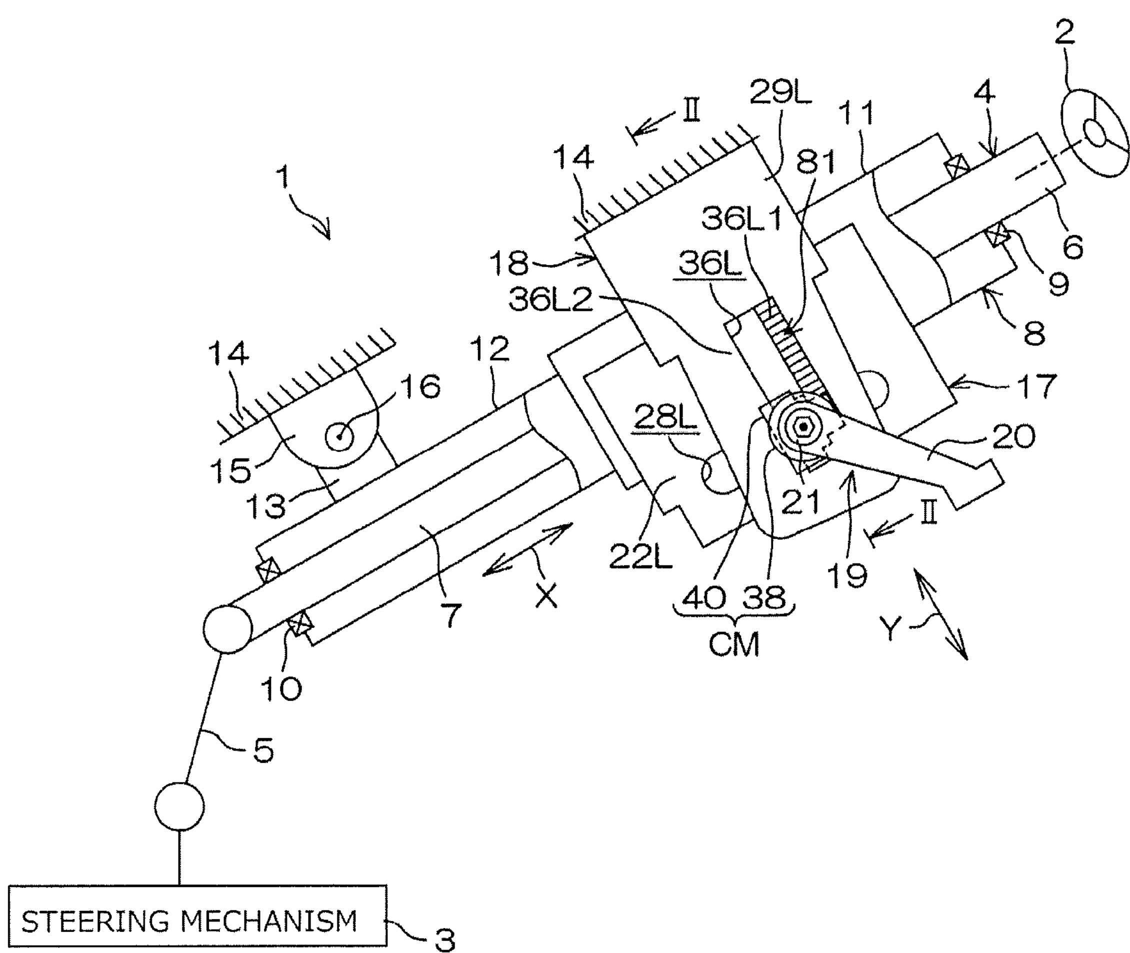
FIG. 1 is a schematic diagram of a steering system according to a first embodiment of the invention, illustrating the schematic configuration of the steering system.

Hereinafter, example embodiments of the invention will be described with reference to the accompanying drawings. FIG. 1 is a schematic diagram illustrating the schematic configuration of a steering system 1 according to an embodiment of the invention. As illustrated in FIG. 1, the steering system 1 includes a steering wheel 2, and a steering mechanism 3 that steers steered wheels (not illustrated) in response to a steering operation of the steering wheel 2. As the steering mechanism 3, for example, a rack-and-pinion mechanism is used.

The steering wheel 2 and the steering mechanism 3 are mechanically connected to each other via a steering shaft 4, an intermediate shaft 5, and the like. The rotation of the steering wheel 2 is transferred to the steering mechanism 3 via the steering shaft 4, the intermediate shaft 5, and the like. The rotation transferred to the steering mechanism 3 is converted into an axial movement of a rack shaft (not illustrated). Thus, the steered wheels are steered.

The steering shaft 4 includes a tubular upper shaft 6 and a tubular lower shaft 7 that are fitted together so as to be slidable relative to each other through, for example, spline-fitting or serration-fitting. The steering wheel 2 is coupled to one end of the upper shaft 6. The steering shaft 4 is allowed to extend and contract in a telescopic direction X that coincides with the axial direction of the steering shaft 4. The steering shaft 4 is passed through a tubular steering column 8 and rotatably supported by the steering column 8 via a plurality of bearings 9, 10.

The steering column 8 includes a tubular upper jacket 11 (movable jacket) and a lower jacket 12 that are fitted together so as to be slidable relative to each other. The upper jacket 11 is disposed radially outward of the lower jacket 12. The steering column 8 is allowed to extend and contract as the upper jacket 11, which is a movable jacket, slides in the axial direction (telescopic direction X) relative to the lower jacket 12. The upper shaft 6 is rotatably supported by the upper jacket 11 via the bearing 9. Further, the upper jacket 11, which is a movable jacket, is coupled to the upper shaft 6 via the bearing 9 so as to be movable together with the upper shaft 6 in the axial direction of the steering shaft 4 (the telescopic direction X).

A movable bracket 13 located on the lower side is fixed to the outer periphery of the lower jacket 12 so as to be movable together with the lower jacket 12. The movable bracket 13 is rotatably supported, via a tilt-center shaft 16, by a stationary bracket 15 located on the lower side and fixed to a vehicle body 14. Thus, the steering column 8 and the steering shaft 4 are allowed to pivot (tilt) about the tilt-center shaft 16 that serves as a fulcrum. By pivoting (tilting) the steering shaft 4 and the steering column 8 about the tilt-center shaft 16 that serves as a fulcrum, so-called tilt adjustment for adjusting the position of the steering wheel 2 is made. Further, by extending and contracting the steering shaft 4 and the steering column 8 in the axial direction (telescopic direction X), so-called telescopic adjustment for adjusting the position of the steering wheel 2 is made.

A movable bracket 17 (corresponding to a distance bracket) located on the upper side and movable together with the upper jacket 11 is fixed to the upper jacket 11. A stationary bracket 18 located on the upper side is fixed to the vehicle body 14. When the movable bracket 17 and the stationary bracket 18 are fastened and locked to each other by a fastening mechanism 19, the position of the steering column 8 is fixed relative to the vehicle body 14 and thus the position of the steering wheel 2 is fixed. The fastening mechanism 19 includes an operating lever 20 and a fastening shaft 21. The operating lever 20 is manually rotated by a driver. The fastening shaft 21 is rotated together with the operating lever 20, and extends through the stationary bracket 18 and the movable bracket 17.

Figure 2:
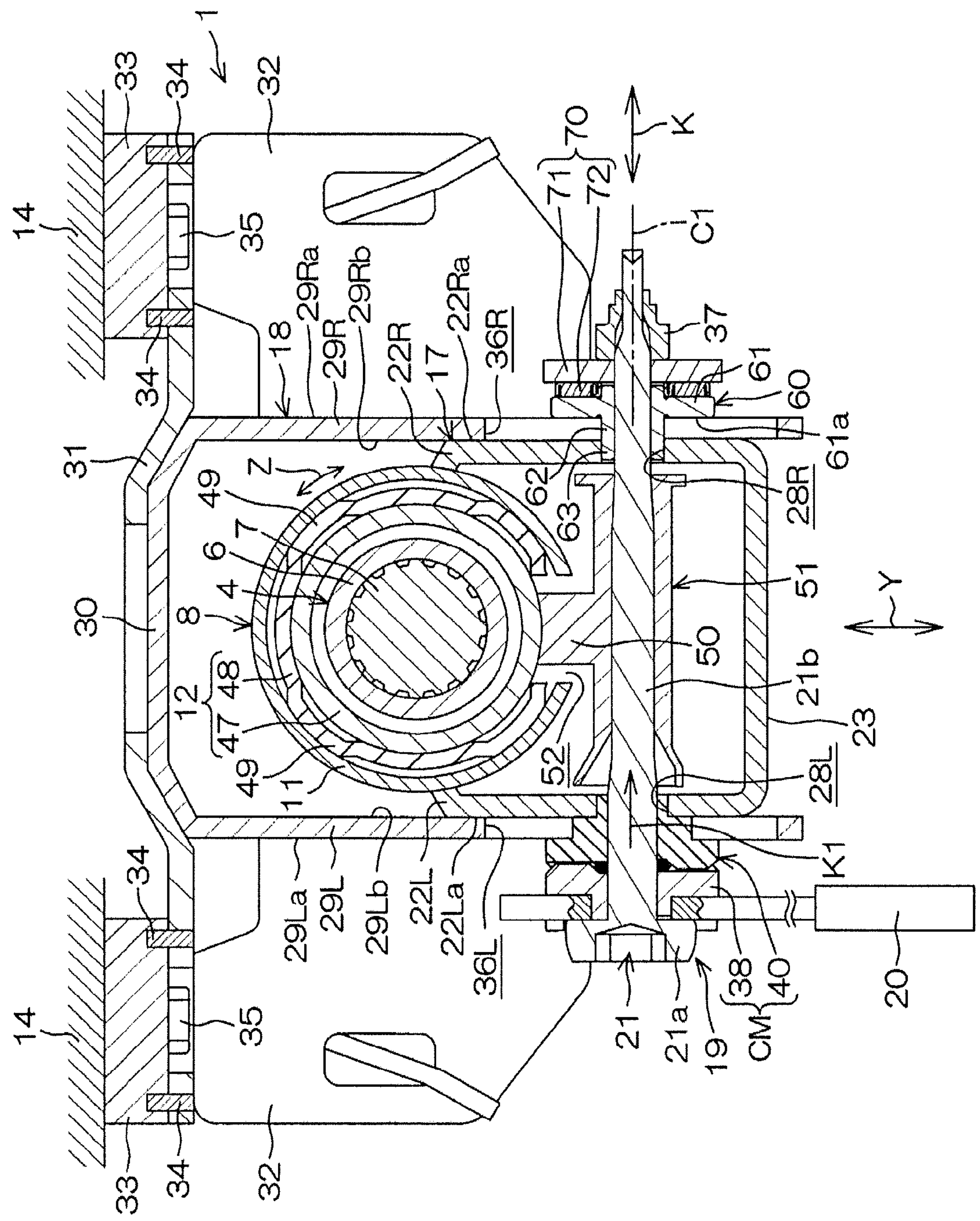
FIG. 2 is a cross-sectional view of the steering system in FIG. 1 taken along the line II-II in FIG. 1.

FIG. 2 is a cross-sectional view schematically illustrating the steering system 1 taken along the line II-II in FIG. 1. As illustrated in FIG. 2, the movable bracket 17 is a member that is formed in a U-shape in cross-section, open toward the upper side in FIG. 2, and formed into a bilaterally symmetrical shape. Specifically, the movable bracket 17 includes a pair of right and left movable side plates 22R, 22L and a connection plate 23. The movable side plates 22R, 22L face each other. The connection plate 23 connects one ends (lower ends in FIG. 2) of the movable side plates 22R, 22L to each other.

The movable side plates 22R, 22L have telescopic slots 28R, 28L that are transversely long insertion slots extending in the telescopic direction X (see FIG. 1, the direction orthogonal to the sheet on which FIG. 2 is drawn). The steering shaft 4 and the steering column 8 are allowed to extend and contract within a range of the length of the telescopic slots 28R, 28L in the longitudinal direction (telescopic direction X). The other ends (upper ends in FIG. 2) of the movable side plates 22R, 22L are fixed to the outer peripheral face of the upper jacket 11.

The stationary bracket 18 includes a pair of right and left stationary side plates 29R, 29L, a connection plate 30, a plate-like attachment stay 31, and a pair of reinforcing extension plates 32. The stationary side plates 29R, 29L face each other. The connection plate 30 connects one ends (upper ends in FIG. 2: corresponding to upper ends 29RU, 29LU in a tilt direction Y described later) of the stationary side plates 29R, 29L to each other. The attachment stay 31 is fixed to the upper face of the connection plate 30. The reinforcing extension plates 32 extend outward from the edges of the stationary side plates 29R, 29L so as to be orthogonal to the stationary side plates 29R, 29L.

Figure 5:
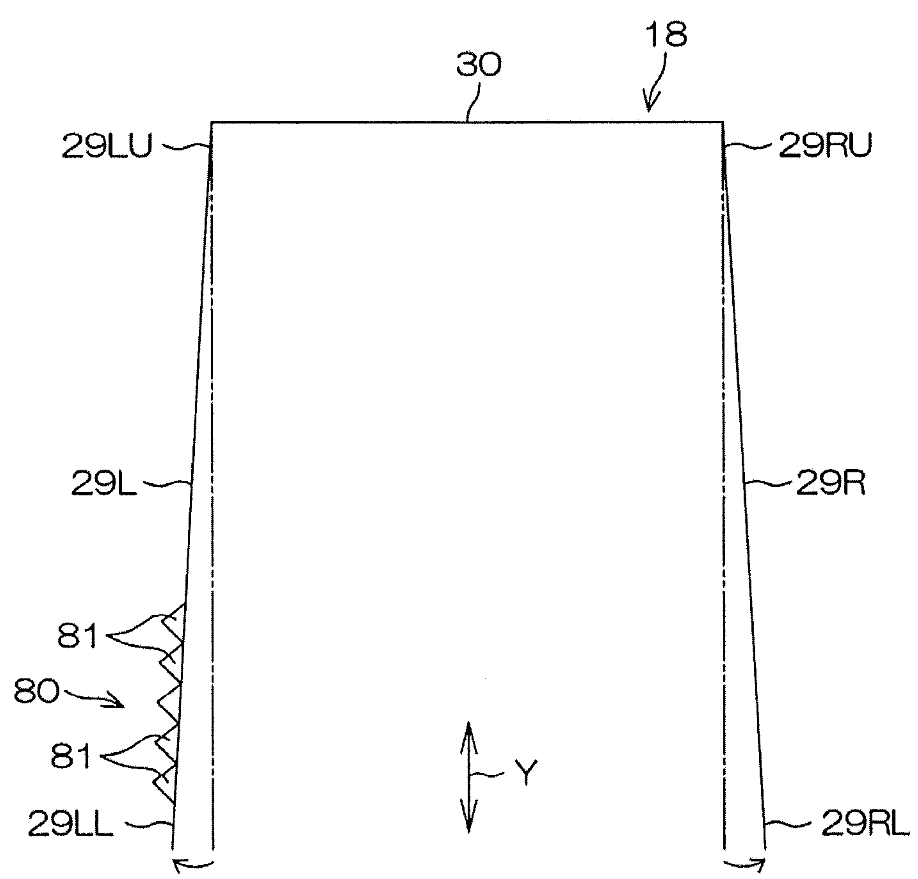
FIG. 5 is a schematic view of a stationary bracket, illustrating a tilt lock state by two-dot chain lines, and illustrating, by solid lines, a tilt lock cancelled state in which the tilt lock is cancelled and the stationary side plates are displaced due to their elastic restoring force so as to spread out into a truncated chevron shape.

The stationary side plates 29R, 29L and the connection plate 30 constitute a member that is formed in a U-shape in cross section, and open toward the lower side in FIG. 2. The steering shaft 4, the steering column 8, and the movable bracket 17 are disposed between the stationary side plates 29R, 29L of the stationary bracket 18, as illustrated in FIG. 2. The stationary side plate 29L has the upper end 29LU in the tilt direction Y, which is a fixed end, and a lower end 29LL in the tilt direction Y, which is a free end. Similarly, the stationary side plate 29R has the upper end 29RU in the tilt direction Y, which is a fixed end, and a lower end 29RL in the tilt direction Y, which is a free end. As illustrated in FIG. 5, which is a schematic view of the stationary bracket 18, when a tilt lock state (illustrated in two-dot chain lines in FIG. 5) is cancelled and a tilt lock cancelled state (illustrated in solid lines in FIG. 5) is established, the stationary side plates 29R, 29L tend to be displaced due to their elastic restoring force such that the amount of outward displacement of the stationary side plates 29R, 29L is increased in a direction toward the lower ends 29RL, 29LL. In other words, the stationary side plates 29R, 29L tend to spread out into a truncated chevron shape.

The stationary bracket 18 is fixed to the vehicle body 14 via a pair of attachment members 33 coupled to the attachment stay 31. The attachment members 33 and the attachment stay 31 are coupled to each other with synthetic resin pins 34 that pass through the attachment stay 31 and that break at the time of absorbing shocks. Each of the attachment members 33 is fixed to the vehicle body 14 with a fixing bolt 35. Inner faces 29Rb, 29Lb of the stationary side plates 29R, 29L of the stationary bracket 18 face outer faces 22Ra, 22La of the movable side plates 22R, 22L of the movable bracket 17, respectively. The stationary side plates 29R, 29L respectively have vertically long tilt slots 36R, 36L that extend in the up-down direction in FIG. 2 (corresponding to the tilt direction Y1 in FIG. 1). The fastening shaft 21 of the fastening mechanism 19 is passed through the telescopic slots 28R, 28L and the tilt slots 36R, 36L.

The fastening mechanism 19 has the function of fastening the stationary bracket 18 to cause the stationary bracket 18 to lock the movable bracket 17, and pressing the lower jacket 12 to lock the lower jacket 12 relative to the upper jacket 11. Specifically, the fastening mechanism 19 includes the fastening shaft 21, a nut 37, a first cam 38, and a second cam 40. The fastening shaft 21 is rotatable together with the operating lever 20 about a central axis C1, and passed through the tilt slots 36R, 36L and the telescopic slots 28R, 28L. The nut 37 is screwed to a threaded portion formed in one end portion of the fastening shaft 21. The first cam 38 is fitted on the outer periphery of a shaft portion 21*b* of the fastening shaft 21, and used to fasten the right side plates 29R, 22R and the left side plates 29L, 22L. The second cam 40 serves as a fastening member. The fastening mechanism 19 further includes a first intervening member 60, a second intervening member 70, a push-up cam 50, and the like. The push-up cam 50 pushes the lower jacket 12 upward in the tilt direction Y1. The first cam 38 and the second cam 40 (fastening member) constitute a cam mechanism CM.

The push-up cam 50 is an eccentric cam that is formed integrally with a sleeve 51 from the same material as that of the sleeve 51 that is fitted to a shaft portion 21*b* of the fastening shaft 21 through, for example, serration fitting so as to be rotatable together with the fastening shaft 21. The push-up cam 50 has the function of pushing, through an opening 52 of the upper jacket 11, the lower jacket 12 upward in the tilt direction Y1 against the inner periphery of the upper jacket 11 at the time of locking by the fastening mechanism 19.

A plurality of cam protrusions (not illustrated) is formed in each of the opposed faces of the first cam 38 and the second cam 40 of the cam mechanism CM. The cam protrusions of the first cam 38 and the cam protrusions of the second cam 40 are engaged with each other. The first cam 38 and the second cam 40 are disposed in the vicinity of a head portion 21 a of the fastening shaft 21. The first cam 38 and the operating lever 20 are coupled to the head portion 21*a* of the fastening shaft 21 so as to be rotatable together with the fastening shaft 21 but immovable relative to the fastening shaft 21 in an axial direction K of the fastening shaft 21. The second cam 40, which serves as the fastening member, fastens the stationary side plate 29L along a fastening direction K1 (corresponding to a direction toward one side in the axial direction K of the fastening shaft 21).

Figure 3:
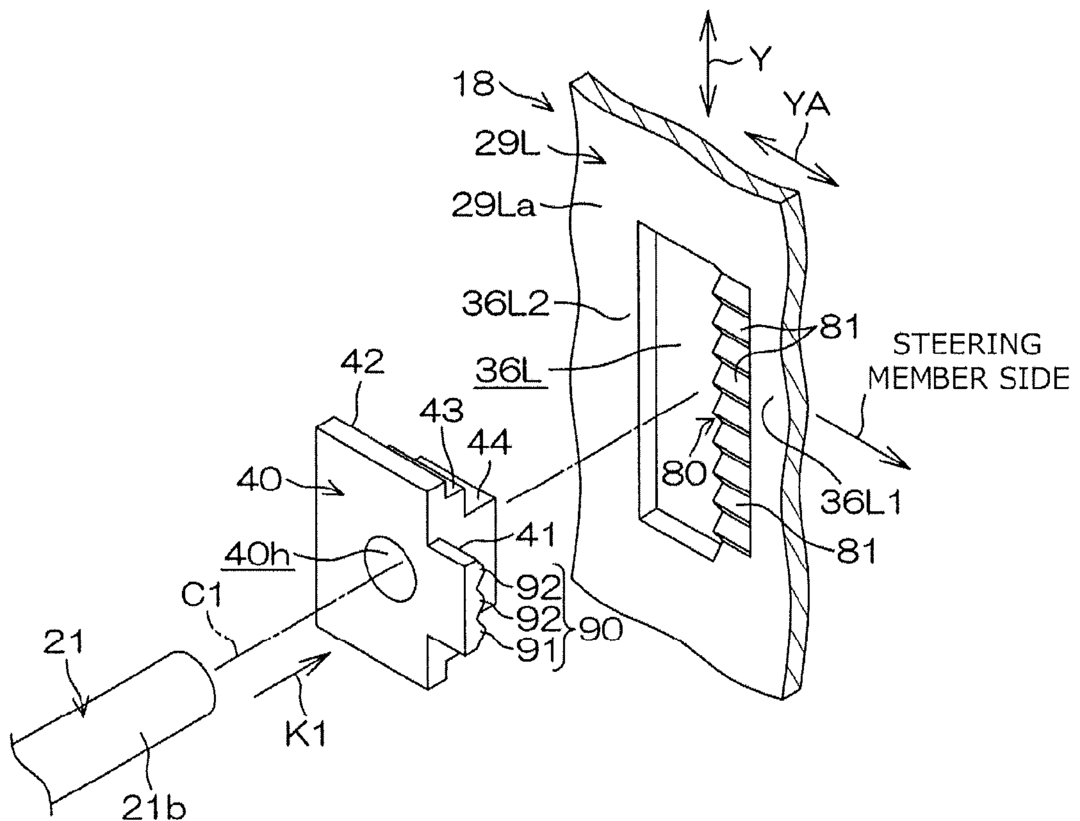
FIG. 3 is an exploded perspective view schematically illustrating a fastening shaft, a second cam (fastening member as a movable member), and a left stationary side plate (restricted member) of a fastening mechanism.

The stationary side plate 29L located on the operating lever 20 side (left side) has a first edge portion 36L1 located on the steering wheel 2 side (right side) of the (left) tilt slot 36L, and a second edge portion 36L2 located on the opposite side (left side) of the tilt slot 36L1 from the first edge portion 36L1. In the present embodiment, as illustrated in FIG. 1 and FIG. 3 described below, a stationary tooth row 80 is formed only in the first edge portion 36L1 (located on the right side of the tilt slot 36L) of the stationary side plate 29L located on the operating lever 20 side (left side). The stationary tooth row 80 is formed of a plurality of stationary teeth 81 aligned in the tilt direction Y1 and having the same design. The second edge portion 36L2 (the left edge portion) is formed in a flat face.

Figure 4:
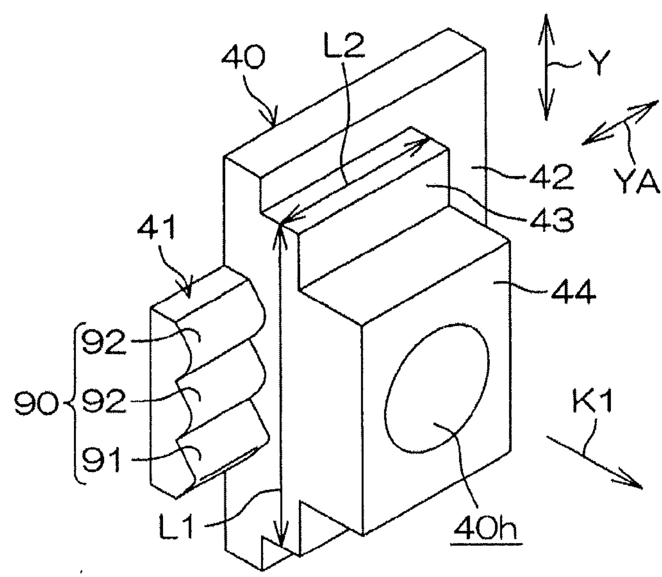
FIG. 4 is a perspective view of the second cam (fastening member as the movable member) as viewed from the back side of the second cam.

FIG. 3 is an exploded perspective view illustrating the fastening shaft 21, the second cam 40 (fastening member), and the left stationary side plate 29L. FIG. 4 is a perspective view of the second cam 40 (fastening member) as viewed from the back side of the second cam 40. As illustrated in FIG. 3 and FIG. 4, the second cam 40, which serves as the fastening member, has an insertion hole 40*h* through which the fastening shaft 21 is passed, and is fitted to the outer periphery of the shaft portion 21*b* of the fastening shaft 21 so as to be rotatable relative to the fastening shaft 21. As illustrated in FIG. 3, the second cam 40 has a first fastening portion 41, a second fastening portion 42, a tilt guide portion 43, and a telescopic guide portion 44. The first fastening portion 41 fastens the first edge portion 36L1 (located on the right side of the tilt slot 36L) in an outer face 29La of the left stationary side plate 29L. The second fastening portion 42 fastens the second edge portion 36L2 (located on the left side of the tilt slot 36L) in the outer face 29La of the left stationary side plate 29L. The tilt guide portion 43 is located between the first fastening portion 41 and the second fastening portion 42, and inserted in the tilt slot 36L. The telescopic guide portion 44 extends from the tilt guide portion 43, and is inserted in the left telescopic slot 28L.

As illustrated in FIG. 4, the first fastening portion 41 has a movable tooth row 90 formed of at least one first movable tooth 91 (in the present embodiment, one first movable tooth 91) and second movable teeth 92 that are engaged with the stationary teeth 81 of the stationary tooth row 80 to fasten the stationary tooth row 80 formed in the first edge portion 36L1 located on the right side of the tilt slot 36L. The movable tooth row 90 is formed of the first movable tooth 91, which may function as a first tooth, and the second movable teeth 92, which may function as second teeth and which are teeth other than the first tooth, the first movable tooth 91 and the second movable teeth 92 being aligned in the tilt direction Y. The second fastening portion 42 is formed in a flat face so as to conform to the second edge portion 36L2.

Figure 6:
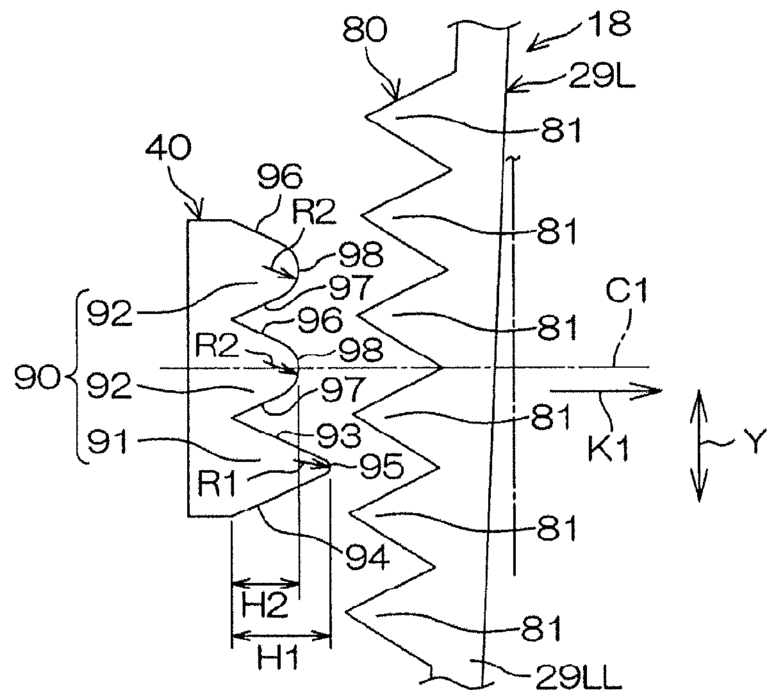
FIG. 6 is a schematic view of a stationary tooth row provided in the left stationary side plate (restricted member) and a movable tooth row provided in the second cam (fastening member as the movable member) in the state where the tilt lock is cancelled.

As illustrated in FIG. 6, the first movable tooth 91 is located below the central axis C1 of the fastening shaft 21 in the tilt direction Y. Especially, in the present embodiment, the first movable tooth 91 is provided solely as the lowermost tooth in the movable tooth row 90 in the tilt direction Y. Alternatively, a plurality of the first movable teeth 91 may be provided. The first movable tooth 91 has a first tooth surface 93 and a second tooth surface 94, which are inclined in the opposite directions, and a rounded portion 95, which serves as a tooth tip that connects the first tooth surface 93 and the second tooth surface 94 to each other. Each of the second movable teeth 92 has a first tooth surface 96 and a second tooth surface 97, which are inclined in the opposite directions, and a rounded portion 98, which serves as a tooth tip that connects the first tooth surface 96 and the second tooth surface 97 to each other. The pressure angle of the first movable tooth 91 is equal to the pressure angle of each of the second movable teeth 92. Although not illustrated, the pressure angle means an angle that is formed between a radius line passing through a certain point on the tooth profile and a tangent to the tooth profile. In other words, the pressure angle corresponds to the inclination of the tooth surface relative to the radius line.

A first curvature radius R1 of the rounded portion 95 of the first movable tooth 91 is set smaller than a second curvature radius R2 of the rounded portion 98 of each of the second movable teeth 92 (R1<R2) to make a tooth depth H1 of the first movable tooth 91 greater than a tooth depth H2 of each of the second movable teeth 92 (H1>H2). The tilt guide portion 43 has the function of guiding the movement of the fastening shaft 21 in the tilt direction Y1 in the tilt slot 36L during tilt adjustment performed in the state where fastening by the fastening mechanism 19 is cancelled. A first length L1 that is the length of the tilt guide portion 43 in the tilt direction Y1 is set longer than a second length L2 that is the length of the tilt guide portion 43 in a direction YA orthogonal to the tilt direction Y1 (L1>L2).

With reference to FIG. 2, the telescopic guide portion 44 has the function of guiding the movement of the fastening shaft 21 in the left telescopic slot 28L in the telescopic direction X (the direction orthogonal to the sheet on which FIG. 2 is drawn, see FIG. 1) during telescopic adjustment performed in the state where fastening by the fastening mechanism 19 is cancelled. The first intervening member 60 and the second intervening member 70 are interposed between the nut 37 screwed to one end portion of the fastening shaft 21 and the right stationary side plate 29R of the stationary bracket 18.

The first intervening member 60 has a fastening portion 61, a tilt guide portion 62, and a telescopic guide portion 63. The fastening portion 61 has a fastening face 61*a* that extends along the outer face 29Ra of the right stationary side plate 29R of the stationary bracket 18 and that fastens the right stationary side plate 29R. The tilt guide portion 62 is fitted in the tilt slot 36R of the right stationary side plate 29R of the stationary bracket 18 so as to be slidable in the tilt direction Y1, and guides the tilt movement of the fastening shaft 21 during tilt adjustment. The telescopic guide portion 63 is inserted in the telescopic slot 28R of the right movable side plate 22R of the movable bracket 17 so as to be slidable in the telescopic direction X (the direction orthogonal to the sheet on which FIG. 2 is drawn), and guides the telescopic movement of the fastening shaft 21 during telescopic adjustment.

Although not illustrated, the tilt guide portion 62 has width across flats at a portion that is fitted in the vertically long tilt slot 36R of the right stationary side plate 29R, and thus the rotation of the tilt guide portion 62 is restricted by the tilt slot 36R. The second intervening member 70 includes a thrust washer 71 and a needle roller thrust bearing 72. The thrust washer 71 is interposed between the fastening portion 61 of the first intervening member 60 and the nut 37. The needle roller thrust bearing 72 is interposed between the thrust washer 71 and the fastening portion 61 of the first intervening member 60. Due to the function of the second intervening member 70 including the needle roller thrust bearing 72, the nut 37 is allowed to smoothly rotate together with the fastening shaft 21.

When the fastening shaft 21 rotates in response to a rotating operation of the operating lever 20, the first cam 38 moves the second cam 40 (fastening member) toward the left stationary side plate 29L of the stationary bracket 18. Thus, the fastening portions 41, 42 of the second cam 40 and the fastening portion 61 of the first intervening member 60 clamp and fasten the stationary side plates 29R, 29L of the stationary bracket 18 from outside. As a result, the side plates 29R, 29L of the stationary bracket 18 clamp the movable side plates 22R, 22L of the movable bracket 17, respectively, and the stationary side plates 29R, 29L are pressed against the movable side plates 22R, 22L, respectively.

The movable teeth 91, 92 of the movable tooth row 90 of the first fastening portion 41 of the second cam 40 (fastening member) are engaged with the stationary teeth 81 of the stationary tooth row 80 of the first edge portion 36L1 (located on the right side of the tilt slot 36L) of the left stationary side plate 29L. Thus, the movable bracket 17 is fastened by the stationary bracket 18, and firm lock is established. The lower jacket 12 includes a metal tube 47 and a resin tube 48 fitted to the outer periphery of the metal tube 47. The resin tube 48 has a plurality of bulged portions 49 arranged at intervals in a circumferential direction Z of the resin tube 48. Although not illustrated, the bulged portions 49 are formed at multiple positions of the resin tube 48 that are apart from each other in the axial direction. Note that the resin tube 48 may be omitted, and the bulged portions 49 may be formed on the outer periphery of the metal tube 47.

Figure 7:
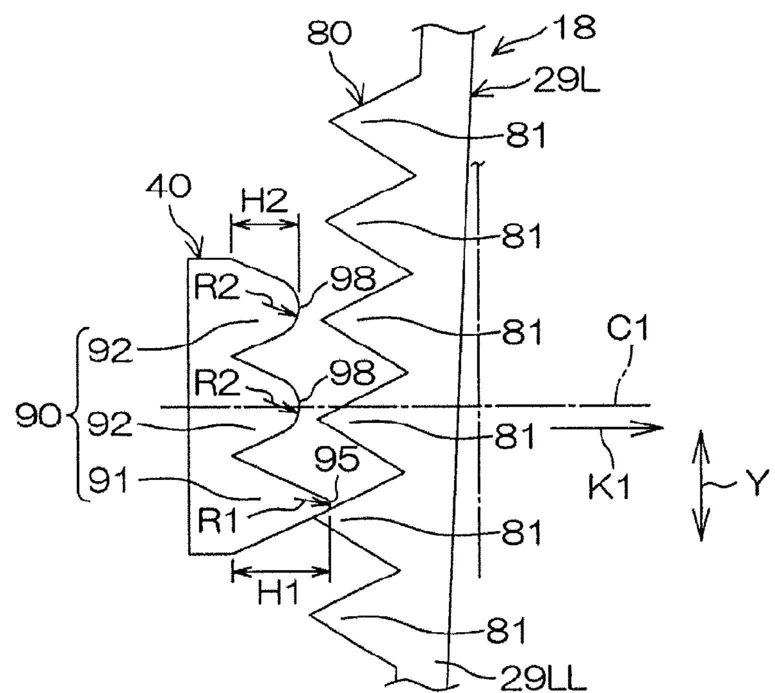
FIG. 7 is a view illustrating the state in the course of shifting from the tilt lock cancelled state to the tilt lock state, and illustrating the state where only a first movable tooth is engaged with corresponding stationary teeth.

According to the present embodiment, in the course of fastening a movable member (the second cam 40 as the fastening member) to a restricted member (the stationary side plate 29L) along the fastening direction K1, as illustrated in FIG. 7, the first movable tooth 91 having the tooth depth H1 that is greater than the tooth depth H2 of each of the second movable teeth 92 engages with the corresponding stationary teeth 81 of the stationary tooth row 80 before the second movable teeth 92 engage with the corresponding stationary teeth 81. Thus, it is possible to guide engagement of the second movable teeth 92 with the corresponding stationary teeth 81 of the stationary tooth row 80. Thus, the possibility of occurrence of half-lock is reduced.

The first curvature radius R1 of the tooth tip (the rounded portion 95) of the first movable tooth 91 is set smaller than a second curvature radius R2 of the tooth tip (the rounded portion 98) of each of the second movable teeth 92 to make the tooth depth H1 of the first movable tooth 91 greater than the tooth depth H2 of each of the second movable teeth 92. In addition, the pressure angle of the first movable tooth 91 and the pressure angle (not illustrated) of the second movable teeth 92 are set equal to each other. This allows easy manufacturing. In the state where tilt lock is cancelled, as illustrated in FIG. 5, the lower ends 29RL, 29LL (free ends) of the stationary side plates 29R, 29L in the tilt direction Y tend to spread out, and the stationary tooth row 80 for the tilt lock, which is formed in the stationary side plate 29L, tends to be displaced such that the amount of outward displacement of the stationary tooth row 80 is increased in a direction toward the lower end 29LL in the tilt direction Y. Thus, the first movable tooth 91 disposed below the central axis C1 of the fastening shaft 21 in the tilt direction Y and having the tooth depth H1 greater than the tooth depth H2 is allowed to be more easily engaged with the corresponding stationary teeth 81 of the stationary tooth row 80. Thus, the possibility of occurrence of half-lock is more reliably reduced during tilt lock. Especially, the first movable tooth 91 having the tooth depth H1 greater than the tooth depth H2 of each of the second movable teeth 92 is provided solely as the lowermost tooth in the movable tooth row 90 in the tilt direction Y. Thus, the possibility of occurrence of half-lock is further reliably reduced during tilt lock.

Figure 8:
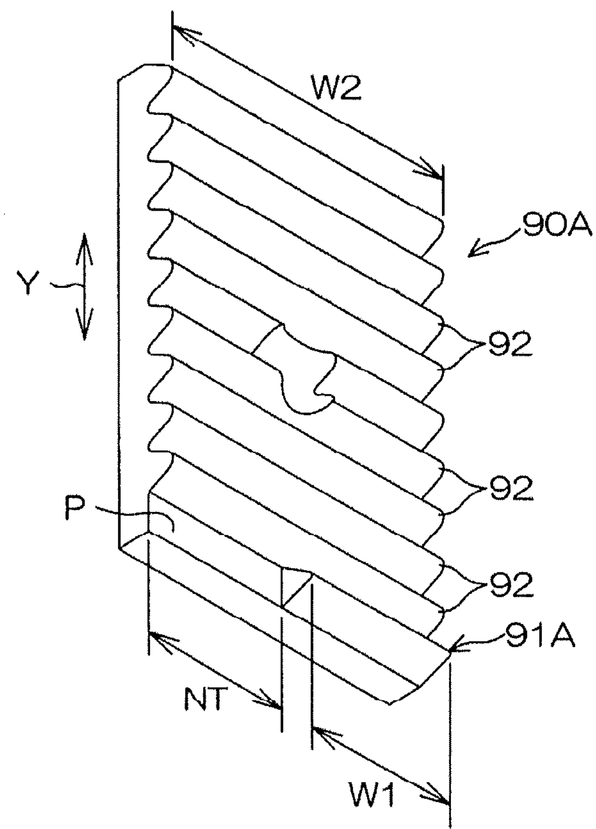
FIG. 8 is a schematic perspective view of a movable tooth row according to a second embodiment of the invention.
Figure 9:
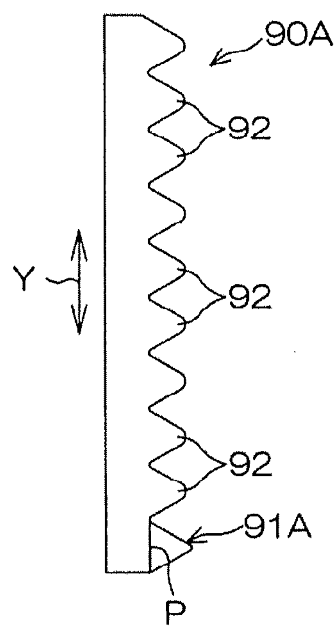
FIG. 9 is a schematic view of the movable tooth row in FIG. 8 as viewed from the tooth trace direction.

FIG. 8 and FIG. 9 illustrate a movable tooth row 90A according to a second embodiment of the invention. As illustrated in FIG. 8 and FIG. 9, the second embodiment differs from the first embodiment illustrated in FIG. 4 mainly in the following configuration. In the movable tooth row 90 in the first embodiment illustrated in FIG. 4, the tooth width of the first movable tooth 91 and the tooth width of each of the second movable teeth 92 are set equal to each other.

On the other hand, as illustrated in FIG. 8, in the movable tooth row 90A in the second embodiment, a tooth width W1 of a first movable tooth 91A is set less than a tooth width W2 of each of the second movable teeth 92 (W1<W2). In the movable tooth row 90A, as illustrated in FIG. 8 and FIG. 9, a region, which adjoins the first movable tooth 91A in the tooth trace direction and which faces the second movable tooth 92 in the tooth thickness direction (corresponding to the tilt direction Y), is defined as a toothless region NT. Specifically, the toothless region NT is formed of a flat portion P.

The same components in the second embodiment illustrated in FIG. 8 and FIG. 9 as those in the first embodiment illustrated in FIG. 4 will be denoted by the same reference symbols as those in the first embodiment illustrated in FIG. 4. The second embodiment produces the same advantageous effects as those of the first embodiment. Further, by setting the tooth width W1 of the first movable tooth 91A less than the tooth width W2 of each of the second movable teeth 92, the possibility of occurrence of half-lock is further reliably reduced during tilt lock.

Figure 10:
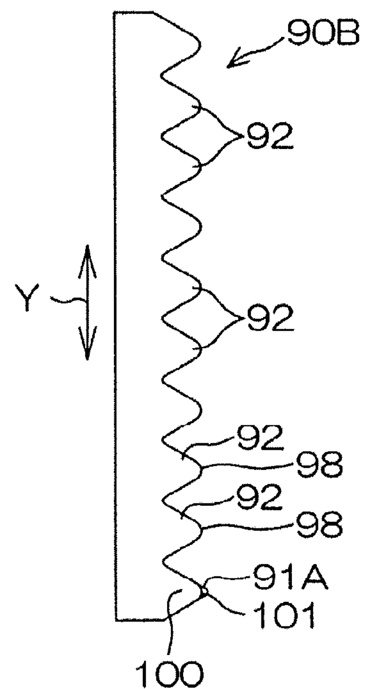
FIG. 10 is a schematic view of a movable tooth row according to a third embodiment of the invention, as viewed from the tooth trace direction.

FIG. 10 illustrates a movable tooth row 90B according to a third embodiment of the invention, as a modified example of the second embodiment. As illustrated in 10, the movable tooth row 90B in the third embodiment differs from the movable tooth row 90A in the second embodiment illustrated in FIG. 9 mainly in the following configuration. In the movable tooth row 90A in the second embodiment in FIG. 9, the region, which adjoins the first movable tooth 91A having a narrow tooth width in the tooth trace direction, is defined as the toothless region NT formed of the flat portion P.

On the other hand, in the movable tooth row 90B in the third embodiment illustrated in FIG. 10, in a region, which adjoins the first movable tooth 91A in the tooth trace direction and which faces the second movable tooth 92 in the tooth thickness direction (corresponding to the tilt direction Y), a third movable tooth 100 having a tooth profile identical to the tooth profile of each of the second movable teeth 92 is provided. The third movable tooth 100 has a rounded portion 101 that serves as a tooth tip and has a shape identical to the shape of the rounded portion 98, which serves as the tooth tip of each of the second movable teeth 92. The same components in the third embodiment illustrated in FIG. 10 as those in the second embodiment illustrated in FIG. 9 will be denoted by the same reference symbols as those in the second embodiment illustrated in FIG. 9. According to the third embodiment, it is possible to enhance the strength with which the teeth of the movable tooth row 90B and the teeth of the stationary tooth row are engaged with each other during lock, while further reliably reducing the possibility of occurrence of half-lock.

Figure 11:
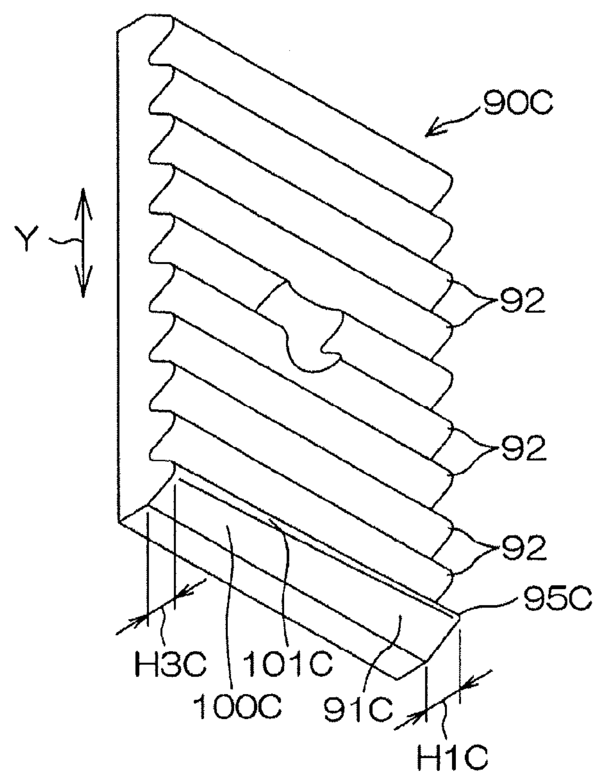
FIG. 11 is a schematic perspective view of a movable tooth row according to a fourth embodiment of the invention.
Figure 12:
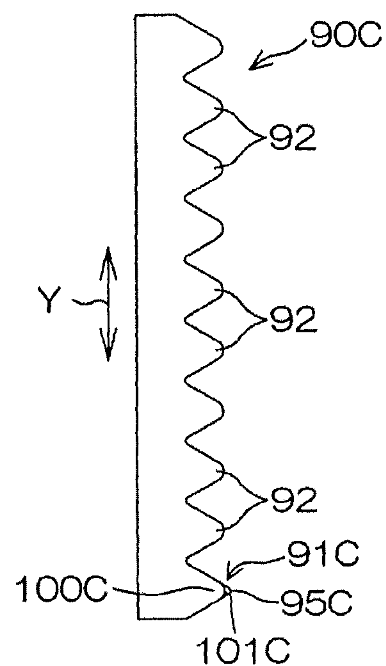
FIG. 12 is a schematic view of the movable tooth row in FIG. 11 as viewed from the tooth trace direction.

FIG. 11 and FIG. 12 illustrate a movable tooth row 90C according to a fourth embodiment of the invention, as a modified example of the third embodiment. As illustrated in FIG. 11, the fourth embodiment differs from the third embodiment illustrated in FIG. 10 mainly in the following configuration. In the movable tooth row 90B in the third embodiment illustrated in FIG. 10, in the region, which adjoins the first movable tooth 91A in the tooth trace direction and which faces the second movable tooth 92 in the tooth thickness direction (corresponding to the tilt direction Y), the third movable tooth 100 having the tooth profile identical to the tooth profile of each of the second movable teeth 92 is provided.

On the other hand, in the movable tooth row 90C in the fourth embodiment illustrated in FIG. 11, in a region, which adjoins a first movable tooth 91C, corresponding to the first movable tooth 91A, in the tooth trace direction and which faces the second movable tooth 92 in the tooth thickness direction (corresponding to the tilt direction Y), a third movable tooth 100C that is continuous with the first movable tooth 91C in the tooth trace direction is provided. A tooth depth H3C of the third movable tooth 100C is continuously changed so as to be gradually decreased from a tooth depth H1C of the first movable tooth 91C in a direction away from the first movable tooth 92C in the tooth trace direction.

More specifically, the curvature radius (not illustrated) of a rounded portion 101C, which serves as a tooth tip of the third movable tooth 100C, is continuously increased from the curvature radius equal to the first curvature radius (not illustrated) of the first movable tooth 91C in a direction away from the first movable tooth 92C in the tooth trace direction. Thus, the tooth depth H3C of the third movable tooth 100C is continuously changed so as to be gradually decreased in a direction away from the first movable tooth 91C in the tooth trace direction.

The same components in the fourth embodiment illustrated in FIG. 11 and FIG. 12 as those in the third embodiment illustrated in FIG. 10 will be denoted by the same reference symbols as those in the third embodiment illustrated in FIG. 10. According to the fourth embodiment, it is possible to enhance the strength with which the teeth of the movable tooth row 90C and the teeth of the stationary tooth row are engaged with each other during lock, while further reliably reducing the possibility of occurrence of half-lock. By gradually increasing the curvature radius of the rounded portion 101C, which serves as the tooth tip of the third movable tooth 100C, in a direction away from the first movable tooth 92C in the tooth trace direction, the tooth depth H3C of the third movable tooth 100C is set to a desired tooth depth. This allows easy manufacturing.

Although not illustrated, a modified example of the fourth embodiment illustrated in FIG. 11 may be made as follows. The curvature radius of the rounded portion 101C, which serves as the tooth tip of the third movable tooth 100C, is increased in a stepwise manner in a direction away from the first movable tooth 92C in the tooth trace direction. Thus, the tooth depth H3C of the third movable tooth 100C is decreased in a stepwise manner in a direction away from the first movable tooth 91C in the tooth trace direction.

Figure 13:
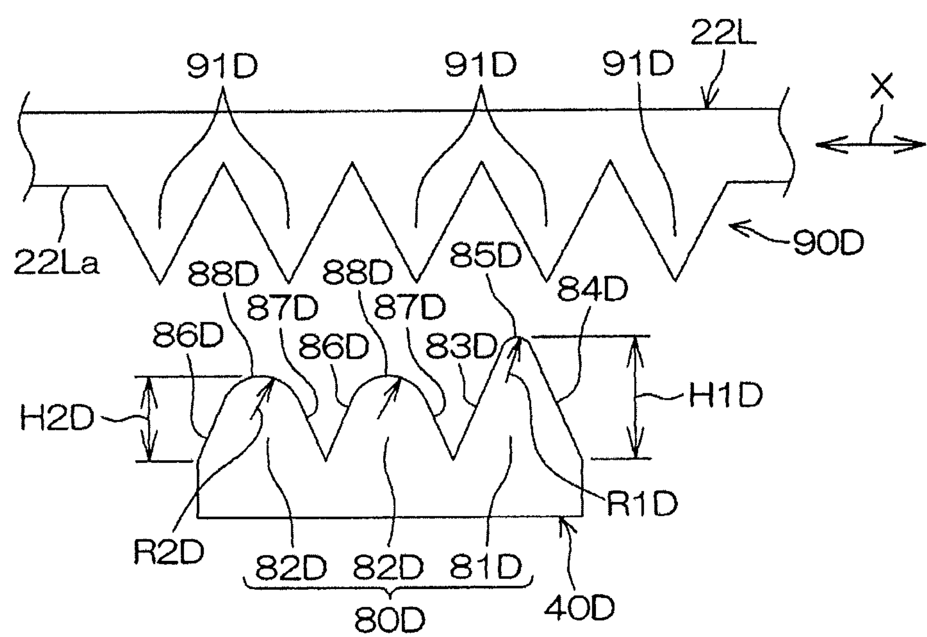
FIG. 13 is a schematic view of a stationary tooth row and a movable tooth row according to a fifth embodiment of the invention.

In the first to fourth embodiments described above, the stationary tooth row and the movable tooth row for tilt lock are provided. On the other hand, in a fifth embodiment illustrated in FIG. 13, a stationary tooth row 80D and a movable tooth row 90D for telescopic lock are provided. A column side plate 22L serves as a movable member that moves in the telescopic direction X together with the steering wheel during telescopic adjustment. On the other hand, a second cam 40D, which serves as the fastening member, functions as a restricted member of which the movement in the telescopic direction X is restricted during telescopic adjustment. Thus, the second cam 40D, which functions as the restricted member during telescopic adjustment, is provided with the stationary tooth row 80D for telescopic lock, and the column side plate 22L, which functions as the movable member during telescopic adjustment, is provided with the movable tooth row 90D for telescopic lock.

Movable teeth 91D of the movable tooth row 90D are aligned in the telescopic direction X. The stationary tooth row 80D includes at least one first stationary tooth 81D, which may function as a first tooth, and second stationary teeth 82D, which may function as second teeth and which are teeth other than the first tooth. The first stationary tooth 81D and the second stationary teeth 82D of the stationary tooth row 80D are aligned in the telescopic direction X. The first stationary tooth 81D has a first tooth surface 83D and a second tooth surface 84D, which are inclined in the opposite directions, and a rounded portion 85D, which serves as a tooth tip that connects the first tooth surface 83D and the second tooth surface 84D to each other. Each of the second stationary teeth 82D has a first tooth surface 86D and a second tooth surface 87D, which are inclined in the opposite directions, and a rounded portion 88D, which serves as a tooth tip that connects the first tooth surface 86D and the second tooth surface 87D to each other. The pressure angle of the first stationary tooth 81D is equal to the pressure angle of each of the second stationary teeth 82D.

A first curvature radius IUD of the rounded portion 85D of the first stationary tooth 81D is set smaller than a second curvature radius R2D of the rounded portion 88D of each of the second stationary teeth 82D (R1D<R2D) to make a tooth depth H1 of the first stationary tooth 81D greater than a tooth depth H2D of each of the second stationary teeth 82D (H1D>H2D). According to the fifth embodiment, it is possible to reduce the possibility of occurrence of the half-lock. Further, the pressure angle of the first stationary tooth 81D is equal to the pressure angle of each of the second stationary teeth 82D. This allows easy manufacturing.

The invention is not limited to the aforementioned embodiments. For example, the stationary tooth row for tilt lock need to be formed in at least one of the first edge portion 36L1 and the second edge portion 36L2 of the left stationary side plate 29L, which are located on the opposite sides of the tilt slot 36L. In addition, the stationary tooth row for tilt lock may be formed in at least one of the first edge portion and the second edge portion of the right stationary side plate 29R, which are located on the opposite sides of the tilt slot 36R. In this case, the first interposing member is provided with a movable tooth row (not illustrated).

What is claimed is:

1. A steering system comprising:

a restricted member that is restrained from being displaced together with a steering wheel during tilt adjustment or telescopic adjustment;

a movable member that is displaced together with the steering wheel during tilt adjustment or telescopic adjustment;

a fastening mechanism that fastens the movable member and the restricted member together along a fastening direction in response to a rotational operation of an operating lever;

a stationary tooth row provided in the restricted member; and a movable tooth row provided in the movable member, and engageable with the stationary tooth row, wherein the movable tooth row includes at least one first movable tooth and at least one second movable tooth, the first movable tooth has a first tooth surface and a second tooth surface, the first tooth surface and second tooth surface being inclined in opposite directions, and a rounded portion that serves as a tooth tip that directly connects the first tooth surface and the second tooth surface to each other, the second movable tooth has a first tooth surface and a second tooth surface, the first tooth surface and second tooth surface of the second movable tooth being inclined in opposite directions, and a rounded portion that serves as a tooth tip that directly connects the first tooth surface and the second tooth surface of the second movable tooth to each other, a pressure angle of the first tooth and a pressure angle of the second tooth are equal to each other, and a tooth depth of the first tooth is made greater than a tooth depth of the second tooth by setting a first curvature radius of the rounded portion of the first tooth, smaller than a second curvature radius of the rounded portion of the second tooth.

2. The steering system according to claim 1, further comprising:

a column jacket by which a steering shaft having one end connected to the steering wheel is rotatably supported; and a column side plate having an insertion slot and fixed to the column jacket, wherein the restricted member is a stationary side plate that has the stationary tooth row for tilt lock, and in which a tilt slot extending in a tilt direction is formed, an upper end of the stationary side plate in the tilt direction is a fixed end that is fixed to a vehicle body, and a lower end of the stationary side plate in the tilt direction is a free end that is located outward of the fixed end in a state where tilt lock is cancelled, the fastening mechanism includes a fastening shaft and a fastening member, the fastening shaft passing through the tilt slot of the stationary side plate and the insertion slot of the column side plate, the fastening member having the movable tooth row for tilt lock, the fastening member being supported by the fastening shaft so as to be movable in an axial direction of the fastening shaft to fasten the stationary side plate toward the column side plate, and the fastening member functioning as the movable member during tilt adjustment, stationary teeth of the stationary tooth row are aligned in the tilt direction, and movable teeth of the movable tooth row are aligned in the tilt direction, and the first movable tooth is located below a central axis of the fastening shaft in the tilt direction.

3. The steering system according to claim 2, wherein the first movable tooth is provided solely as a lowermost tooth in the movable tooth row in the tilt direction.

4. The steering system according to claim 3, wherein a tooth width of the first movable tooth is set smaller than a tooth width of the second tooth.

5. The steering system according to claim 4, wherein the movable tooth row has a toothless region as a region that adjoins the first movable tooth in a tooth trace direction of the first movable tooth, and that faces the second movable tooth in the tilt direction.

6. The steering system according to claim 4, wherein the movable tooth row includes a third movable tooth having a tooth profile identical to a tooth profile of the second movable tooth, in a region that adjoins the first movable tooth in a tooth trace direction of the first movable tooth and that faces the second movable tooth in the tilt direction.

7. The steering system according to claim 4, wherein:

the movable tooth row includes a third movable tooth that is continuous with the first movable tooth in a tooth trace direction of the first movable tooth, in a region that adjoins the first movable tooth in the tooth trace direction and that faces the second movable tooth in the tilt direction; and a tooth depth of the third movable tooth is reduced continuously or in a stepwise manner from a tooth depth that is equal to the tooth depth of the first movable tooth in a direction away from the first movable tooth in the tooth trace direction.

8. The steering system according to claim 7, wherein a curvature radius of a rounded portion of the third movable tooth, the rounded portion being a tooth tip of the third movable tooth, is increased continuously or in a stepwise manner from a curvature radius that is equal to the first curvature radius of the first movable tooth in the direction away from the first movable tooth in the tooth trace direction.

9. The steering system according to claim 2, wherein a tooth width of the first movable tooth is set smaller than a tooth width of the second tooth.

10. The steering system according to claim 9, wherein the movable tooth row has a toothless region as a region that adjoins the first movable tooth in a tooth trace direction of the first movable tooth, and that faces the second movable tooth in the tilt direction.

11. The steering system according to claim 9, wherein the movable tooth row includes a third movable tooth having a tooth profile identical to a tooth profile of the second movable tooth, in a region that adjoins the first movable tooth in a tooth trace direction of the first movable tooth and that faces the second movable tooth in the tilt direction.

12. The steering system according to claim 9, wherein:

the movable tooth row includes a third movable tooth that is continuous with the first movable tooth in a tooth trace direction of the first movable tooth, in a region that adjoins the first movable tooth in the tooth trace direction and that faces the second movable tooth in the tilt direction; and a tooth depth of the third movable tooth is reduced continuously or in a stepwise manner from a tooth depth that is equal to the tooth depth of the first movable tooth in a direction away from the first movable tooth in the tooth trace direction.

13. The steering system according to claim 12, wherein a curvature radius of a rounded portion of the third movable tooth, the rounded portion being a tooth tip of the third movable tooth, is increased continuously or in a stepwise manner from a curvature radius that is equal to the first curvature radius of the first movable tooth in the direction away from the first movable tooth in the tooth trace direction.

14. The steering system according to claim 1, further comprising:

a column jacket by which a steering shaft having one end connected to the steering wheel is rotatably supported, and that moves in a telescopic direction during telescopic adjustment; and a column side plate having the movable tooth row for telescopic lock, fixed to the column jacket, and functioning as the movable member during telescopic adjustment, wherein stationary teeth of the stationary tooth row are aligned in the telescopic direction, and movable teeth of the movable tooth row are aligned in the telescopic direction, and the stationary tooth row includes a first stationary tooth as the first tooth and a second stationary tooth as the second tooth.

* * * * *